United States Patent
Nakaya (10) Patent No.: US 7,712,119 B1
(45) Date of Patent: May 4, 2010

(54) MULTIMEDIA COMMUNICATION TERMINAL

(75) Inventor: Yuichiro Nakaya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1475 days.

(21) Appl. No.: 10/332,573

(22) PCT Filed: Jul. 10, 2000

(86) PCT No.: PCT/JP00/04591

§ 371 (c)(1),
(2), (4) Date: Jan. 10, 2003

(87) PCT Pub. No.: WO02/05558

PCT Pub. Date: Jan. 17, 2002

(51) Int. Cl.
*H04N 7/173* (2006.01)
*H04N 7/64* (2006.01)

(52) U.S. Cl. .................... 725/62; 725/121; 714/704

(58) Field of Classification Search ............. 725/62, 725/121; 370/395.21, 395.43; 714/47, 48, 714/703–704, 818, 820
See application file for complete search history.

(56) References Cited

U.S. PATENT DOCUMENTS

| | | | | |
|---|---|---|---|---|
| 5,606,725 A * | 2/1997 | Hart | ............................. | 725/131 |
| 5,742,892 A * | 4/1998 | Chaddha | ..................... | 725/146 |
| 6,169,821 B1 * | 1/2001 | Fukunaga et al. | ........... | 382/239 |
| 6,243,568 B1 * | 6/2001 | Detlef et al. | ............. | 455/226.4 |
| 6,266,817 B1 * | 7/2001 | Chaddha | ..................... | 725/146 |
| 6,425,132 B1 * | 7/2002 | Chappell | ..................... | 725/107 |
| 6,487,316 B1 | 11/2002 | Fukunaga et al. | | |
| 6,490,705 B1 * | 12/2002 | Boyce | ......................... | 714/776 |
| 6,587,433 B1 * | 7/2003 | Borella et al. | ............... | 370/230 |
| 6,665,336 B2 * | 12/2003 | Abdelilah et al. | ........... | 375/225 |
| 6,728,410 B1 * | 4/2004 | Fukunaga | .................. | 382/236 |
| 6,757,005 B1 * | 6/2004 | Elbaz et al. | ............. | 348/14.09 |
| 6,778,533 B1 * | 8/2004 | Kovacevic et al. | .......... | 370/392 |
| 6,798,838 B1 * | 9/2004 | Ngo | ...................... | 375/240.19 |
| 6,807,648 B1 * | 10/2004 | Cansever et al. | ............ | 714/776 |
| 6,917,617 B2 * | 7/2005 | Jin et al. | ................ | 370/395.21 |
| 7,000,030 B2 * | 2/2006 | Rasanen et al. | ............. | 709/246 |
| 7,142,567 B1 * | 11/2006 | Caracciolo et al. | .......... | 370/516 |
| 2002/0010938 A1 * | 1/2002 | Zhang et al. | .................. | 725/95 |

FOREIGN PATENT DOCUMENTS

| | | |
|---|---|---|
| JP | 9-149421 | 6/1997 |
| JP | 10164552 | 6/1998 |
| JP | 11069325 | 3/1999 |
| JP | 2000032437 | 1/2000 |

* cited by examiner

*Primary Examiner*—Brian T Pendleton
*Assistant Examiner*—Jonathan V. Lewis
(74) *Attorney, Agent, or Firm*—Brundidge & Stanger, P.C.

(57) ABSTRACT

The invention relates to a multimedia communication terminal that enables error resilience control according to a situation of a communication channel and the preference of a user based upon a multimedia communication terminal using a communication channel where a transmission error occurs, means for directly receiving a request of a user in relation to error resilience is provided to a receiving terminal, the information is transmitted to a transmitting terminal and the level of error resilience of a coded bit stream is changed.

6 Claims, 8 Drawing Sheets

MULTIMEDIA COMMUNICATION TERMINAL

BACKGROUND OF THE INVENTION

The present invention relates to a multimedia communication system under the influence of transmission errors in communication channels.

Environment for video communication using a wireless mobile terminal is being well-ordered. Once it was said that the development of such a communication terminal was difficult because of the technical constraint of three items of little channel capacity (a low transmission bit rate), a large transmission error rate and little battery capacity (equivalent to low computational power). However, the technical constraint of the three items is being surmounted by the development of high bit rate mobile telephone systems represented by IMT-2000, image coding methods with high compression rates and high error resilience represented by MPEG-4 and the development of high-performance batteries and a low-power consumption processors.

Figure 1:
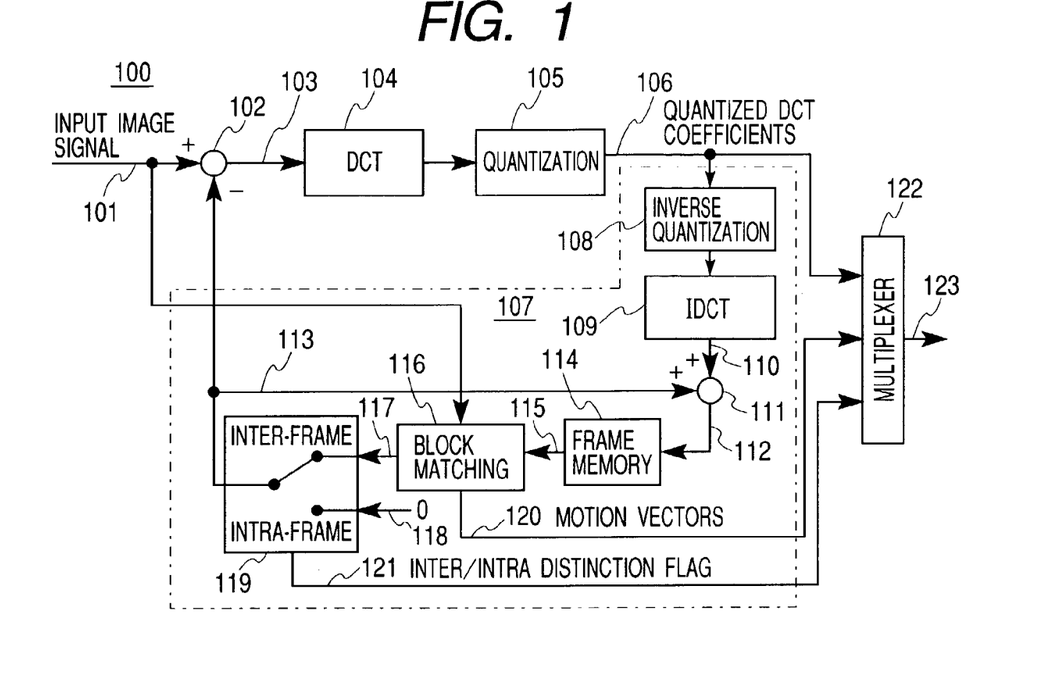
FIG. 1 shows an example of the configuration of a video coder conforming to MPEG-4.

FIG. 1 shows an example of the configuration of an encoder 100 conforming to the international standard MPEG-4. In MPEG-4, a hybrid coding method (inter-/intra-frame adaptable coding) of block matching and discrete cosine transform (DCT) is adopted. A subtractor 102 calculates difference between an input image signal (the original image signal of the current frame) 101 and an image signal 113 (described later) output from an inter-/intra-frame coding selection switch 119 and outputs an error image signal 103. The error image signal is quantized by a quantizer 105 to be quantized DCT coefficients after it is converted to DCT coefficients in a DCT converter 104. The quantized DCT coefficients are output to a communication channel as transmitted information and simultaneously, are used for synthesizing an inter-frame prediction image signal in the encoder.

Figure 2:
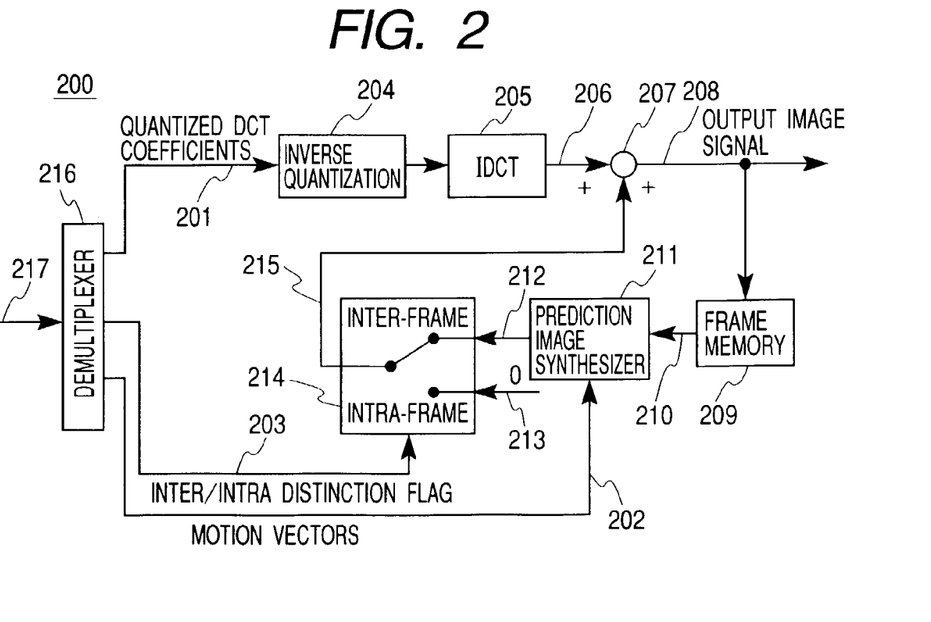
FIG. 2 shows an example of the configuration of an image signal decoder conforming to MPEG-4.

Next, a procedure for synthesizing the prediction image signal will be described. The prediction image signal is synthesized in a block 107 enclosed by an alternate long and short dash line in the encoder 100. The quantized DCT coefficients 106 become a decoded error image signal 110 (the same image signal as an error image signal reconstructed in a receiver) via an inverse quantizer 108 and an IDCT converter 109. The image signal 113 (described later) output from the inter-/intra-frame coding selection switch 119 is added to this signal in an adder 111 and a decoded image signal 112 (the same signal as a decoded image signal of the current frame reconstructed in the receiver) of the current frame is obtained. The image signal is once stored in a frame memory 114 and is delayed by time equivalent to one frame. Therefore, currently, the frame memory 114 outputs a decoded image signal 115 of the previous frame. The decoded image signal of the previous frame and the input image signal 101 of the current frame are input to a block matching module 116 and a block matching process is executed there. In the block matching module, a prediction image signal 117 of the current frame is synthesized by dividing each image signal into plural blocks and extracting the most similar part to the original image signal of the current frame every block from the decoded image signal of the previous frame. At this time, processing for detecting how much each block moves between the previous frame and the current frame (a motion estimation process) is required to be executed. The motion vectors of the blocks detected by the motion estimation process is transmitted to the receiver as motion vector information 120. The receiver can synthesize the same prediction image signal as the prediction image signal obtained at the transmitter based upon the motion vector information and the decoded image signal of the previous frame. The prediction image signal 117 is input to the inter-/intra-frame coding selection switch 119 together with zero 118. The switch switches inter-frame coding and intra-frame coding by selecting one of these input signals. In case the prediction image signal 117 is selected (FIG. 2 shows this case), inter-frame coding is executed. On the other hand it zero is selected, the input image signal is coded using DCT as it is and is output to the communication channel, executing intra-frame coding. For the receiver to acquire a correctly decoded image signal, it is required to be known whether inter-frame coding or intra-frame coding was executed at the transmitter. Therefore, an inter-/intra-frame coding distinction flag 121 is output to the communication channel. A final H.263 coded bit stream 123 is obtained by multiplexing the quantized DCT coefficients, the motion vector and information in the inter-/intra-frame coding distinction flag in a multiplexer 122.

FIG. 2 shows an example of the configuration of a decoder 200 that receives the coded bit stream 123 output from the encoder 100 shown in FIG. 1. A received MPEG-4 bit stream 217 is demultiplexed into quantized DCT coefficients 201, motion vector information 202 and an intra-/inter-frame coding distinction flag 203 in a demultiplexer 216. The quantized DCT coefficients 201 become a decoded error image signal 206 via an inverse quantizer 204 and an IDCT converter 205. An image signal 215 output from an inter-/intra-frame coding selection switch 214 is added to the error image signal in an adder 207 and a decoded image signal 208 is output. The inter-/intra-frame coding selection switch 214 switches its output according to the inter-/intra-frame coding distinction flag 203. A prediction image signal 212 used in the case of inter-frame coding is synthesized in a prediction image signal synthesizer 211. Here, the processing for moving the position of each block is executed for a decoded image signal 210 of the previous frame stored in the frame memory 209 according to the received motion vector information 202. In the meantime, in the case of intra-frame coding, the inter-/intra-frame coding selection switch outputs zero 213 as it is.

An image signal coded according to MPEG-4 is composed of one luminance plane (a Y plane) having luminance information and two chrominance planes (a U plane and a V plane) having chrominance information. When an image signal includes 2 m pixels horizontally and 2 n pixels vertically (m and n are a positive integer), the image signal is characterized in that the Y plane has 2 m pixels horizontally and 2 n pixels vertically and the U and V planes have m pixels horizontally and n pixels vertically. The reason why the resolution of the chrominance plane is low as described above is that a human visual system is relatively insensitive to the spatial variation of chrominance. Encoding and decoding are executed for such an input image signal in units of a block called a macroblock in MPEG-4.

Figure 3:
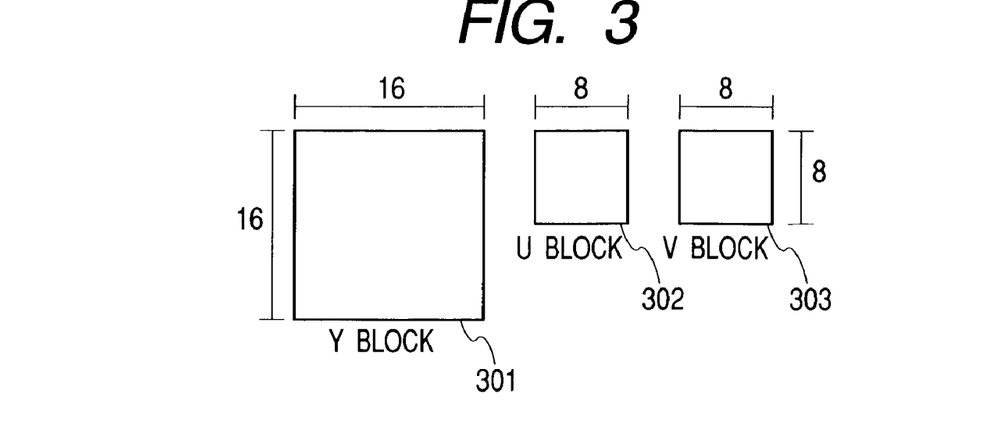
FIG. 3 shows the configuration of a macroblock in MPEG-4.

FIG. 3 shows the configuration of the macroblock. The macroblock is composed of three blocks of the Y block, the U block and the V block, the Y block 301 having luminance value information is composed of "16×16 pixels", and the U block 302 and the V block 303 having chrominance information are both composed of "8×8 pixels". In MPEG-4, intra-frame coding and inter-frame coding are switched in units of macroblock. In the block matching process, a motion vector can be transmitted every macroblock.

In wireless communication, it is almost impossible to prevent a transmission error from happening in a transmission channel. In the meantime, coded data compressed using to information compression techniques is weak against bit errors (the inversion of bits in the data) and the inversion of a few bits may cause the decoder to go out of control (a state in which a reconstruction process is stopped, a state in which the reception of input information from a user is not accepted, etc.) or serious deterioration of reconstructed information. Generally, in data communication, it is often assumed that no error occurs in transmitted data or an extremely small bit error rate (probability that a bit included in data is inverted) is achieved. This can be done by utilizing an error correction code such as Reed-Solomon code or a retransmission protocol that make a transmitter to retransmit corrupted packets. However, the use of the error correction code and the retransmission protocol causes substantial deterioration of the bit rate of transmitted data and the increase of transmission delay, and is not necessarily a suitable solution in real time communication at low bit rates.

Due to the reasons described in the previous paragraph, in low bit rate image communication in wireless environment, where it is supposed that bit errors occur frequently in a coded bit stream received by a receiver, error resilience coding techniques for minimizing the deterioration of a reconstructed image obtained by decoding the bit stream are necessary. A simplest example of such error resilience coding technique is to increase the rate of macroblocks using intra-frame coding. In inter-frame coding, where a reconstructed image of the previous frame is used for the decoding of the current frame, the deterioration in a certain frame remains in the succeeding frames. To prevent this phenomenon from occurring, the rate of macroblocks using intra-frame coding should be increased so that the deterioration caused in the previous frame may hardly be taken over in the succeeding frames. However, the increase of the rate of macroblocks using intra-frame coding generally causes the deterioration of coding performance (the quality of decoded images when the bit rate is fixed). That is, in case the error resilience of a coded bit stream is enhanced using the method described above, the quality of a reconstructed image when no transmission error occurs is conversely deteriorated.

In an image coding method defined in the international standard MPEG-4, the following three types of error resilience coding techniques are further adopted.

(1) Resync Marker:

In a coded bit stream conforming to MPEG-4, 16 or more bits of zeroes 0 are not continuously arranged except in special code words. There are two such special code words: a video object plane (VOP) start code indicating the Starting Point of a VOP (which means "frame" in MPEG-4); and a resync marker. The resync marker is a code word intentionally transmitted by an encoder in a transmitter to enhance the error resilience of a coded bit stream. The resync marker can be inserted immediately before the coding information of any macroblock except the first macroblock of a VOP. If a decoder finds that a coded bit stream includes an error, the next resync marker is searched and if the decoding is restarted from data succeeding it, at least the data after the resync marker can be correctly decoded. The encoder in the transmitter can adjust the frequency in which resync markers are inserted into a coded bit stream by to its own decision. If the frequency in which a resync marker is inserted is increased, error resilience is obviously enhanced. However, as reverse effect, since coding performance is usually deteriorated by the transmission of redundant information, the quality of a reconstructed image in case no transmission error occurs is deteriorated.

(2) Data Partitioning:

It is known that when a motion vector of a macroblock is decoded erroneously because of a transmission error, more seriously deterioration is caused in a reconstructed image, compared with a case where an error occurs in the information related to DCT coefficients. Knowing this, the concept of data partitioning is that the important information included in the macroblocks between two resync markers is gathered and transmitted before the relatively un important information. The reason for this is that the probability that the information transmitted immediately after a resync marker is influenced by a transmission error is lower than such probability for the information transmitted immediately before the resync marker.

The following three types of information are given priority in data partitioning: type information of macroblocks; motion vector information (only in the case of inter-frame coding); and DC DCT coefficients (only in the case of intra-frame coding). For example, when information related to five macroblocks for inter-frame coding is located between resync markers, five motion vectors are transmitted after the type information of the five macroblocks is first transmitted and finally, DCT coefficients related to the five macroblocks are transmitted. when the transmission frequency of resync markers is high, the enhancement of error resilience by data partitioning is intensified. Therefore, when error resilience is enhanced, coding performance will be deteriorated.

(3) Reversible Variable Length Code (VLC):

In MPEG-4, variable length code in which code length varies according to the generated information is used. However, generally, data coded using variable length code can be decoded only unidirectionally. That is, after finding the starting point of coded data correctly, the coded data is required to be decoded in the order of transmission. However, by using special techniques, a variable length code which can be also decoded from a reverse direction (a reversible variable length code) can be designed. By using the reversible variable length code decoding in reverse direction from the end point of a bit stream become possible. This makes it possible to decode corrupted bit stream that cannot be decoded in forward direction, minimizing the amount of lost information.

In MPEG-4, reversible variable length code can be used for coding DCT coefficients. Even if the reversible variable length code is used, it is still true that the starting point (the ending point) of data must be found correctly. Moreover, reversible variable length code is not applicable to the coding of motion vectors and the types of macroblocks. Therefore, to enhance error resilience, the transmission frequency of resync markers is required to be increased and this deteriorates coding performance.

The deterioration of the quality of a decoded image when the coded bit stream is corrupted can be greatly reduced by using the above error resilience techniques. However, attention is required to be paid in that the above error resilience technique has a common property that when error resilience is enhanced, coding performance is deteriorated. That is, when error resilience is enhanced more than necessary, the quality of a reconstructed image in a receiver may be conversely deteriorated. The deterioration (the emergence of a pattern not found in an original image, etc.) of image quality caused by bit errors and the deterioration (blurry image, etc.) of image quality caused by the reduction of coding performance are generally different in characteristics. There is a personal taste in the relative level of disturbance that a viewer of a reconstructed image feels from the above two types of deterioration and even if the bit error rates are the same, the optimum level of error resilience is often different depending upon the preference of the viewer.

SUMMARY OF THE INVENTION

The error resilience of a coded bit stream and coding performance are in the relation of a trade-off. The object of the invention is to configure a multimedia communication system in which the optimum level of error resilience is selected according to conditions such as the preference of a user and the state of a transmission channel.

The optimum level of error resilience applied to a transmitted coded bit stream is selected by a user himself/herself operating a terminal according to the preference of the user or according to conditions such as the state of a transmission channel.

DESCRIPTION OF THE PREFERRED EMBODIMENTS

Figure 4A:
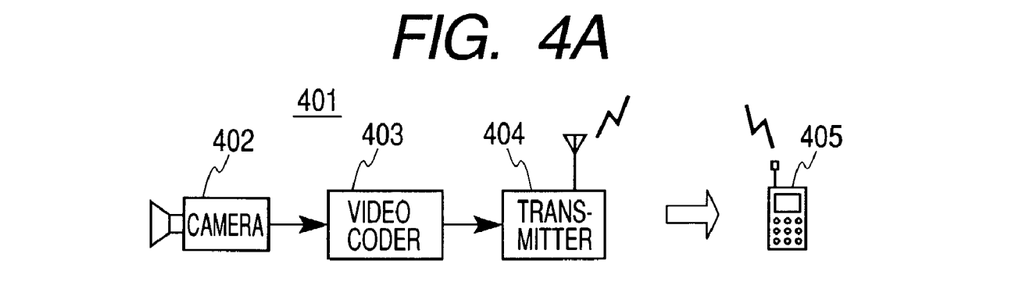
FIGS. 4A to 4C show examples of the configuration of a system according to the invention.
Figure 4B:
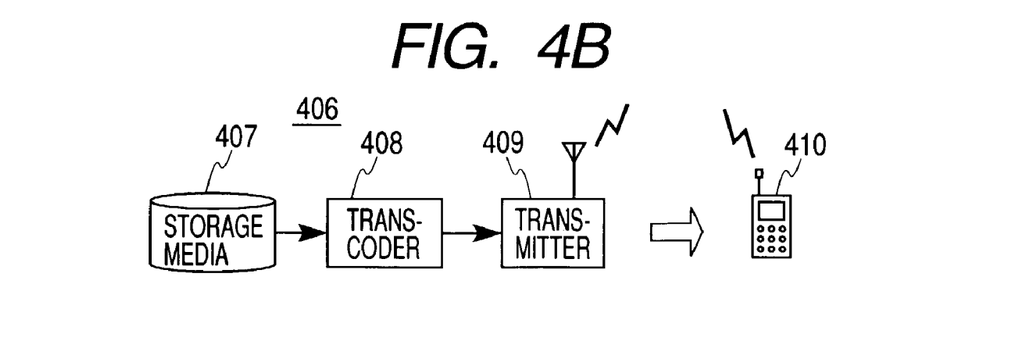
Figure 4C:
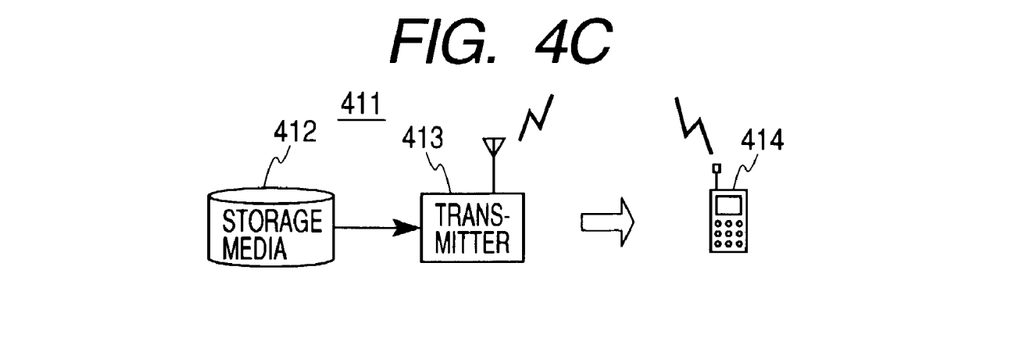

FIGS. 4A to 4C show embodiments of a communication system according to the invention. In the transmitting terminal 401 shown in FIG. 4A, the input of an image signal via a camera 402 and image encoding in real time by a video coder 403 are executed. The bit stream encoded there is transmitted using a transmitter 404 and a terminal 405 at the receiving end reconstructs the image signal. In a transmitting terminal 406 shown in FIG. 4B, a bit stream encoded at a high bit rate is recorded in a storage medium 407, and real-time transcoding (conversion of a bit rate) is done in a transcoder 408, reducing the bit rate to a level at which transmission using a transmission channel is possible. A bit stream that meets the temporary requirement can be generated by transcoding in real time. A bit stream generated as described above is transmitted using a transmitter 409 and a terminal 410 at the receiving end receiver and reconstructs it. In the meantime, in a transmitting terminal 411 shown in FIG. 4C, an encoded bit stream for transmission is stored in a storage medium 412, a selected bit stream is transmitted using a transmitter 413, and a terminal 414 at the receiving end receives it.

Supposing that video and audio information is included in the transmitted information, the following items can be considered as examples of methods for changing the error resilience of a transmitted bit stream.

① Frequency of Macroblocks using Intra-frame Coding:
When the frequency is increased, error resilience is enhanced, however, coding performance is deteriorated.

② Frequency of Resync Markers:
In case the frequency is increased, error resilience is enhanced, however, coding performance is deteriorated.

③ Stopping the Transmission of Audio Information:
If the transmission of audio information is stopped, the error resilience of image information can be enhanced using the bit rate for audio information. However, a user feels disturbance because no audio information is transmitted.

④ Stopping the Transmission of Video Information:
If the transmission of video information is stopped, the error resilience of audio information can be enhanced using the bit rate for video information. However, the user feels disturbance because no video information is transmitted.

An example of error resilience control in which these items are combined is as follows.

First Level:
　At least two macroblocks per VOP shall be coded using intra-frame coding.
　A resync marker is transmitted at the first boundary between macroblocks after 480 bits from the preceding resync marker.
　Both image and audio information is transmitted.

Second Level:
　At least two macroblocks per VOP shall be coded using intra-frame coding.
　A resync marker is transmitted at the first boundary between macroblocks after 640 bits from the preceding resync marker.
　Both image and audio information is transmitted.

Third Level:
　At least four macroblocks per VOP shall be coded using intra-frame coding.
　A resync marker is transmitted at the first boundary between macroblocks after 640 bits from the preceding resync marker.
　Both image and audio information is transmitted.

Fourth Level:
At least four macroblocks per VOP shall be coded using intra-frame coding.
A resync marker is transmitted at the first boundary between macroblocks after 640 bits from the preceding resync marker.
Only video information is transmitted.

Fifth Level:
Only audio information is transmitted.

In this example, the error resilience at the first level is the lowest and as the number increases up to the fifth level, the error resilience increases. However, the quality of reconstructed information in case no error occurs on a transmission line is conversely more deteriorated as the number of the level increases.

Furthermore, there may be various types in the recognition of error resilience among different users. For example, even if the same reconstructed video is presented, there are some users who recognize this as high noise and low frame rate, and other users who recognize this as low noise and high frame rate. The requirements related to error resilience in the invention also include the solution for dealing with such personal taste in recognition.

Figure 5:
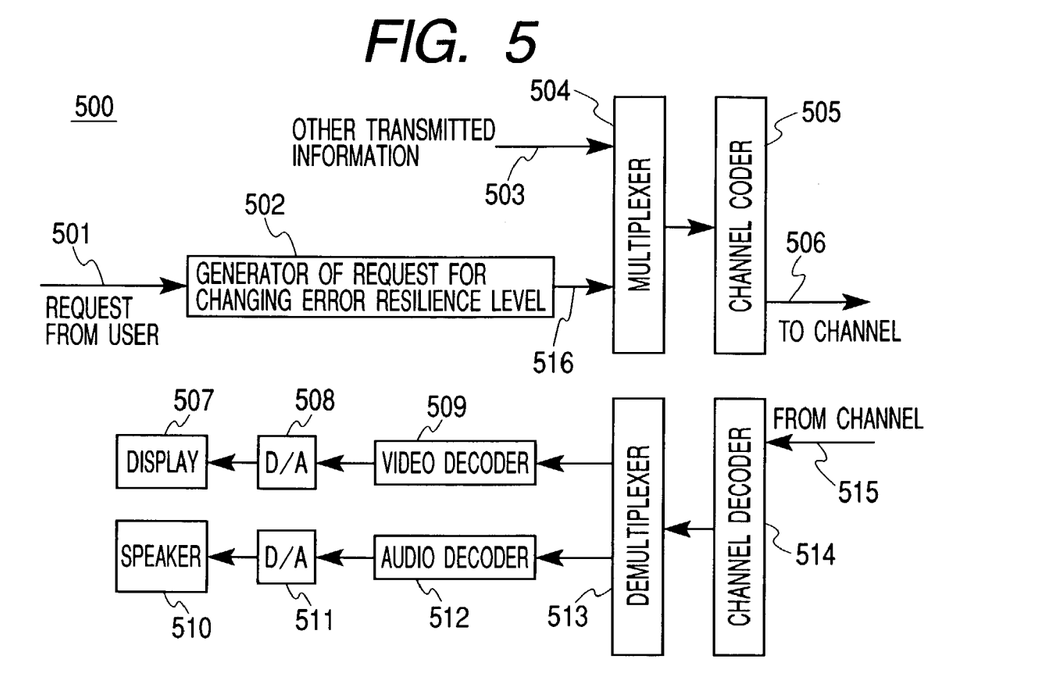
FIG. 5 shows an example of the configuration of a receiving terminal in which the error resilience of a bit stream transmitted by a transmitter is changed in response to a request of a user.

FIG. 5 shows an example of the configuration of a receiving terminal 500 that changes the error resilience of a bit stream transmitted by a transmitter in response to a request of a user. The terminal is provided with a function for receiving and reconstructing a bit stream in which video information and audio information are encoded. A signal 515 received via a transmission channel is supplied to a demultiplexer 513 via a channel decoder 514 and is demultiplexed into a coded video bit stream and a coded audio bit stream. The coded video bit stream is decoded in an image signal decoder 509. The decoded digital image signal is displayed on a display 507 via a digital/analog converter 508. Similarly, the coded audio bit stream is decoded in an audio decoder 512 and is output to a speaker 510 via a digital/analog converter 511 after the coded audio bit stream is decoded into digitized reconstructed audio signal. In the meantime, the user inputs a request 501 of the user in relation to error resilience and a request 516 for changing the error resilience level generated in a generator 502 of a request for changing the error resilience level according to this input of the user is transmitted to the transmitter via a multiplexer 504 and a channel encoder 505 as transmitted information 506. The request 501 of the user in this case may be relative (for example, the current level of error resilience can be raised/lowered by one level) or absolute (for example, the level of error resilience such as transmission of audio only can be directly specified). In case the receiving terminal has other information 503 to be transmitted (for example, if the terminal is a bidirectional communication terminal and image and audio information is transmitted from it) this information is multiplexed with the request 516 for changing the error resilience level. If the error resilience of a bit stream transmitted from the transmitter can be directly adjusted according to the request of the user as in the terminal described above, optimum reconstructed information in terms of the personal preference of the user can be obtained. The request 516 for changing the error resilience level generated in the generator 502 of the request for changing the error resilience level can have 2 bits for example, and '00' can denote that no request for a change is made, '01' can denote that a request for raising an error resilience level is made and '10' can denote that a request for lowering the error resilience level is made. When the error resilience level is specified by an absolute numerical value, the number of transmitted bits should be increased. For example, if the error resilience level change request signal is composed of three bits and '000' is defined as a state that no request for a change is made, seven error resilience levels can be requested.

For the user interface when the user of the terminal requests the change of error resilience using the terminal shown in FIG. 5, various methods can be considered. For example, buttons for requesting to raise and to lower the error resilience level can be provided. Another solution is to use the buttons for inputting telephone numbers for malting the requests. If, a mode button or a menu button is provided on the terminal, then the terminal can change its state to a wait-for-request state when the button is pressed for a specified number of times. Under such state, it can be defined that the error resilience level is raised when the button "0" is pressed and the error resilience level is reduced when the button "1" is pressed.

Figure 6:
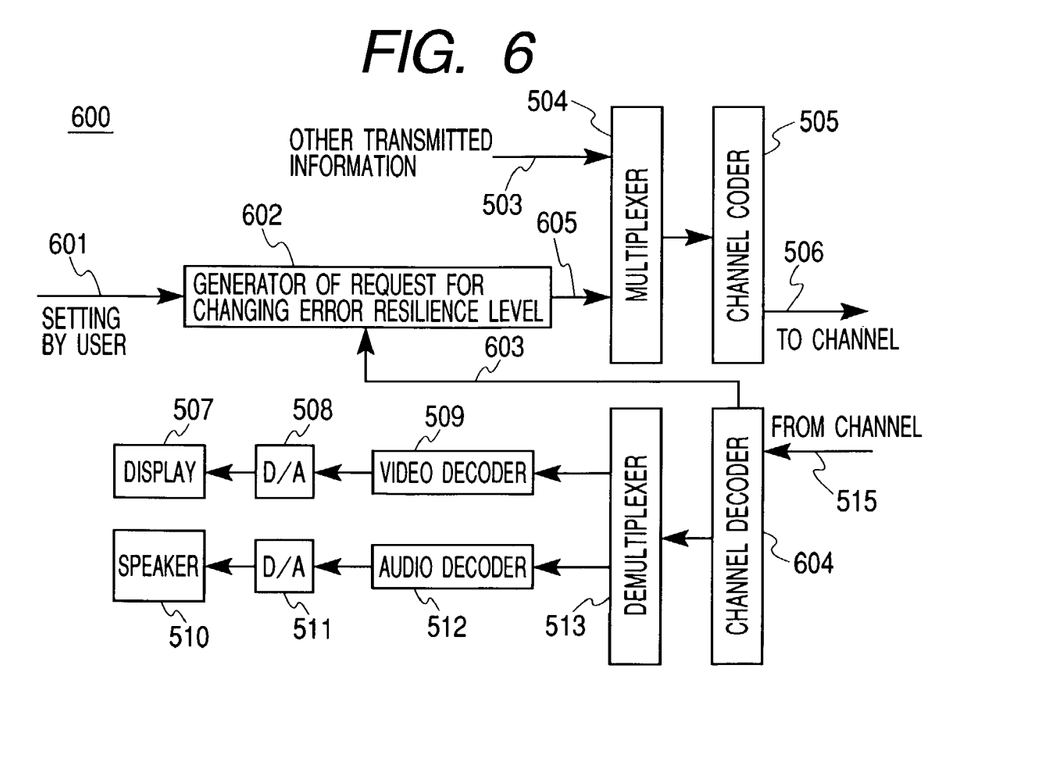
FIG. 6 shows an example of the configuration of a receiving terminal in which a state such as a transmission error rate of a transmission channel is observed and an error resilience level of a bit stream transmitted from a transmitter is automatically adjusted.

FIG. 6 shows an example of the configuration of a receiving terminal 600 in which a characteristic of a communication channel such as the transmission error rate is observed and the error resilience level of a bit stream transmitted from the transmitter is automatically adjusted. The same reference number is allocated to the same component as that shown in FIG. 5. Information 603 related to the situation of bit error occurrence in a bit stream received via a communication channel is output from a channel decoder 604 of the terminal. The situation of bit error occurrence can be checked using the error detection or error correction code used for channel coding. The information related to the situation of bit error occurrence is input to a generator 602 of a request for changing the error resilience level and a request 605 for changing the error resilience level to be transmitted to the transmitter is changed according to the situation of bit error occurrence.

Figure 7:
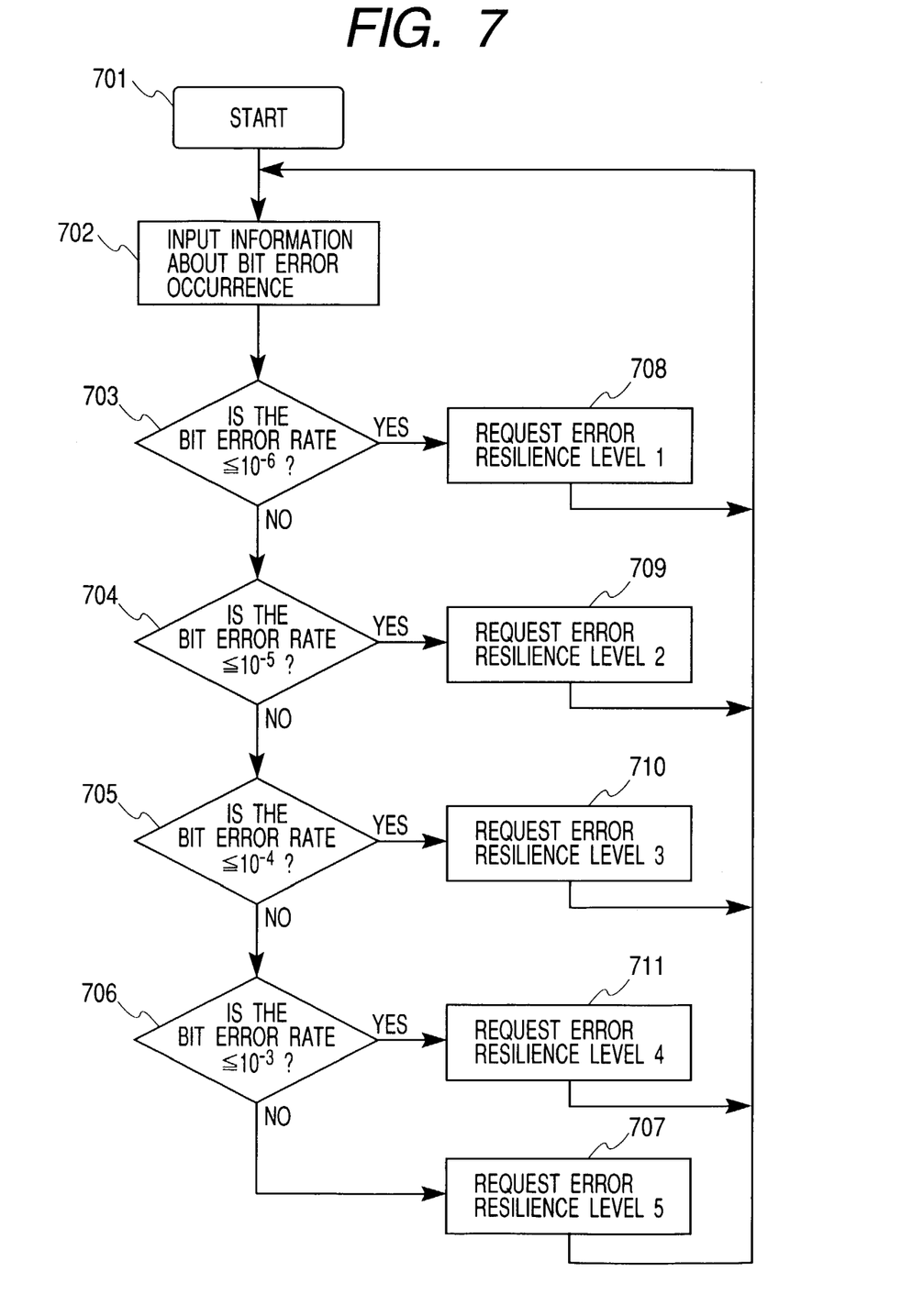
FIG. 7 shows an example of a flowchart showing processing in a generator of a request for changing the error resilience level which is included in the terminal shown in FIG. 6.

FIG. 7 shows an example of a flowchart showing processing in the generator 602 of the request for changing the error resilience level. In step 701, the processing is started and next, in step 702, information related to the situation of bit error occurrence (603 in FIG. 6) in a received bit stream is input. If the bit error rate is $10^{-6}$ or less in step 703, a signal that requests error resilience at the first level is transmitted in step 708. Similarly, in case respective bit error rates are $10^{-5}$ or less, $10^{-4}$ or less and $10^{-3}$ or less in steps 704, 705 and 706, signals that respectively request error resilience at the second, third and fourth levels are transmitted in steps 709, 710 and 711. In the meantime, in case the bit error rate exceeds $10^{-3}$, a signal that requests error resilience at the fifth level is transmitted in step 707.

In the terminal 600 shown in FIG. 6, a level of error resilience requested corresponding to the bit error rate can be changed according to setting 601 by a user. Utilizing this function, the setting of the terminal can be changed according to the preference of the user for example, so that error resilience at the first level is requested when a bit error rate is $10^{-4}$ or less and error resilience at the fifth level is requested when the bit error rate exceeds $10^{-4}$. As described above, for a user interface when the user individually inputs the setting of error resilience to the terminal, various methods can be considered. For example, a method of preparing a mode button or a menu button and turning the terminal into a state in which the terminal waits for the setting change given by the user when the button is pressed for a specified number of times can be considered. The change of the setting by the user may either be made before the start of communication or during communication. A configuration such that the setting by the user is recorded in a flash memory built in the terminal and the setting by the user stored in the flash memory is necessarily transmitted to the terminal of a destination immediately after the start of communication when the terminal communicates with another terminal can also be considered.

Further, in addition to the automatic change of an error resilience level described in relation to FIG. 6, if necessary, the selective use of the request for manually changing the error resilience level described in relation to FIG. 5 may also be enabled. In this case, as the normal setting, the user sets a desired error resilience setting in the generator 602 of the request for changing the error resilience level beforehand so that the system automatically follows it, and the terminal cancels this normal setting and manually changes the error resilience level only when the user wants to manually change the error resilience level. For the user interface for this terminal, as in the case of FIG. 5, for example, a button for raising the error resilience level and a button for conversely lowering the error resilience level can individually be provided, and the normal setting can be released by operating these buttons and the manual change of an error resilience level may be enabled. This function can also be realized by utilizing the specific buttons for inputting telephone numbers. If a mode button or a menu button is provided, the terminal can be turned into a state that the terminal waits for input for setting an error resilience level when the button is pressed for a specified number of items, and the functions of respective buttons may be defined so that for example, when button "0" is pressed, the error resilience level is raised and when button "1" is pressed, the error resilience level is conversely lowered.

When it is allowed to set the error resilience level according to the preference of a user, the user may forget his/her own setting and have dissatisfaction related to the receiving state. Therefore, when the user sets an error resilience level according to the preference of the user, it is desirable that a message showing the error resilience level set by the user is displayed on a screen of the receiving terminal.

Figure 8:
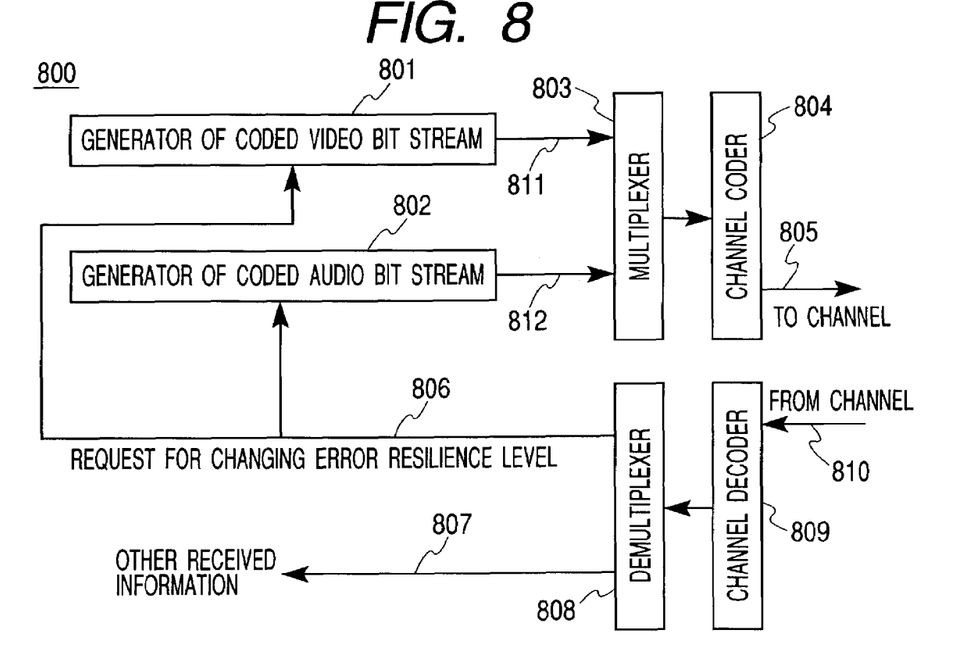
FIG. 8 shows an example of the configuration of a transmitting terminal corresponding to the receiving terminals shown in FIGS. 5 and 6.

FIG. 8 shows an example of the configuration of a transmitting terminal 800 corresponding to the terminals shown in FIGS. 5 and 6. Information 810 transmitted from the terminal of the receiver is demultiplexed into a request 806 for changing the error resilience level and the other received information 807 via a channel decoder 809 and a demultiplexer 808. The request for changing the error resilience level is input to both a generator 801 of a coded video bit stream and a generator 802 of a coded audio bit stream, and the error resilience levels of a coded video bit stream 811 and a coded audio bit stream 812 respectively output according to the request are changed in the respective generators. These bit streams are multiplexed in a multiplexer 803 and are output to a communication channel via a channel coder 804 as transmitted information 805.

Figure 9A:
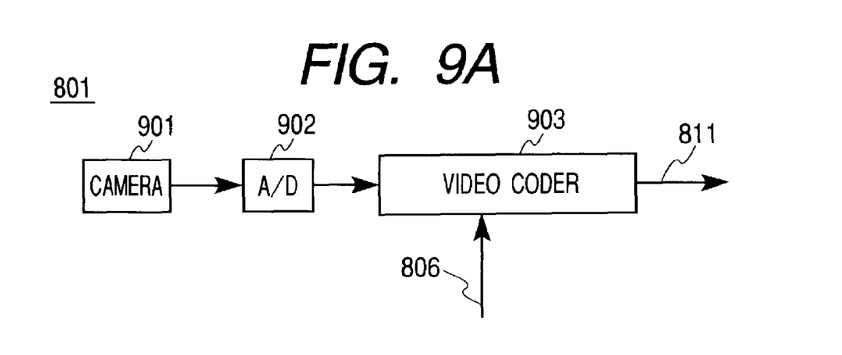
FIG. 9A shows an example of the configuration of a generator of a coded video bit stream shown in FIG. 8 when an image signal is coded in real time in the example of the configuration of the system shown in FIG. 4A.

FIG. 9A shows an example of the configuration of the generator of a coded video bit stream 801 shown in FIG. 8 in case an image signal is encoded in real time in the transmitting terminal 401 shown in FIG. 4A. The same reference number is allocated to the same component as that shown in FIG. 8. Image information input via a camera 901 is input to a video coder 903 via an analog/digital (A/D) converter 902. The video coder changes the error resilience level of an output coded video bit stream 811 according to the request 806 for changing the error resilience level.

Figure 9B:
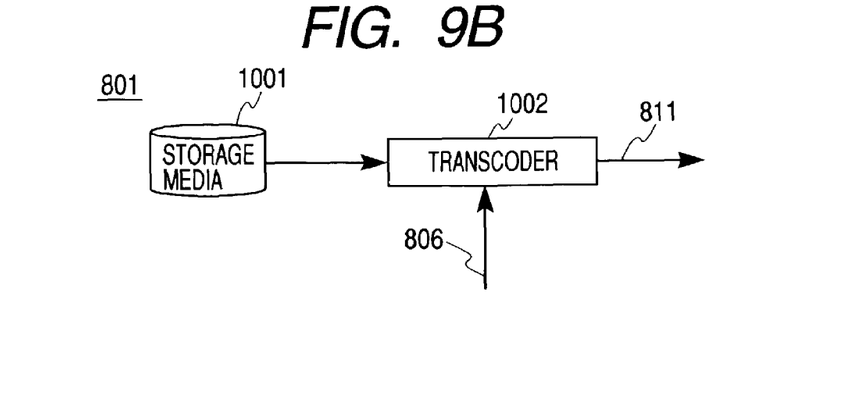
FIG. 9B shows an example of the configuration of the generator of a coded video bit stream shown in FIG. 8 when the transcoding of an image signal is executed in real time in the example of the configuration of the system shown in FIG. 4B

FIG. 9B shows an example of the configuration of the generator of a coded video bit stream 801 shown in FIG. 8 in case the transcoding of an image signal is executed in real time in the transmitting terminal 406 shown in FIG. 4B. The same reference number is allocated to the same component as that shown in FIG. 8. Image information recorded in a storage medium 1001 such as a hard disk is input to a transcoder 1002. The transcoder changes the error resilience level of an output coded video bit stream 811 according to the request 806 for changing the error resilience level.

Figure 9C:
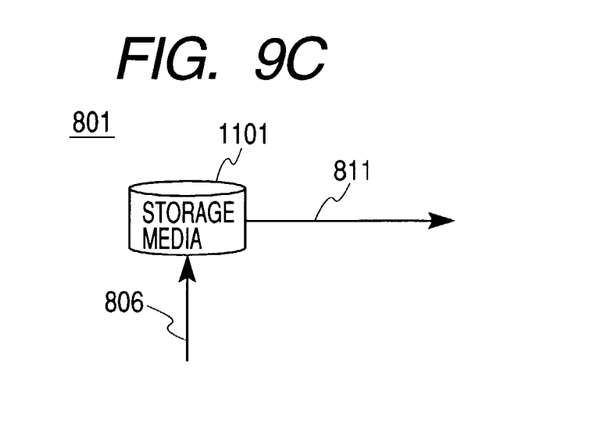
FIG. 9C shows an example of the configuration of the generator of a coded video bit stream shown in FIG. 8 when a stored bit stream is transmitted as it is in the example of the configuration of the system shown in FIG. 4C.

FIG. 9C shows an example of the configuration of the generator of a coded video bit stream 801 shown in FIG. 8 in case a stored bit stream is transmitted as it is in the transmitting terminal 411 shown in FIG. 4C. In this case, a coded bit stream having error resilience at each level is stored beforehand in a storage medium 1101. Therefore, processing can be realized only by selecting and outputting the corresponding coded bit stream according to the request 806 for changing the error resilience level.

The invention can be also applied to a software terminal using a general-purpose processor in addition to the conventional type terminals using the dedicated circuit and the dedicated chip shown in FIGS. 5, 6 and 8.

Figure 10:
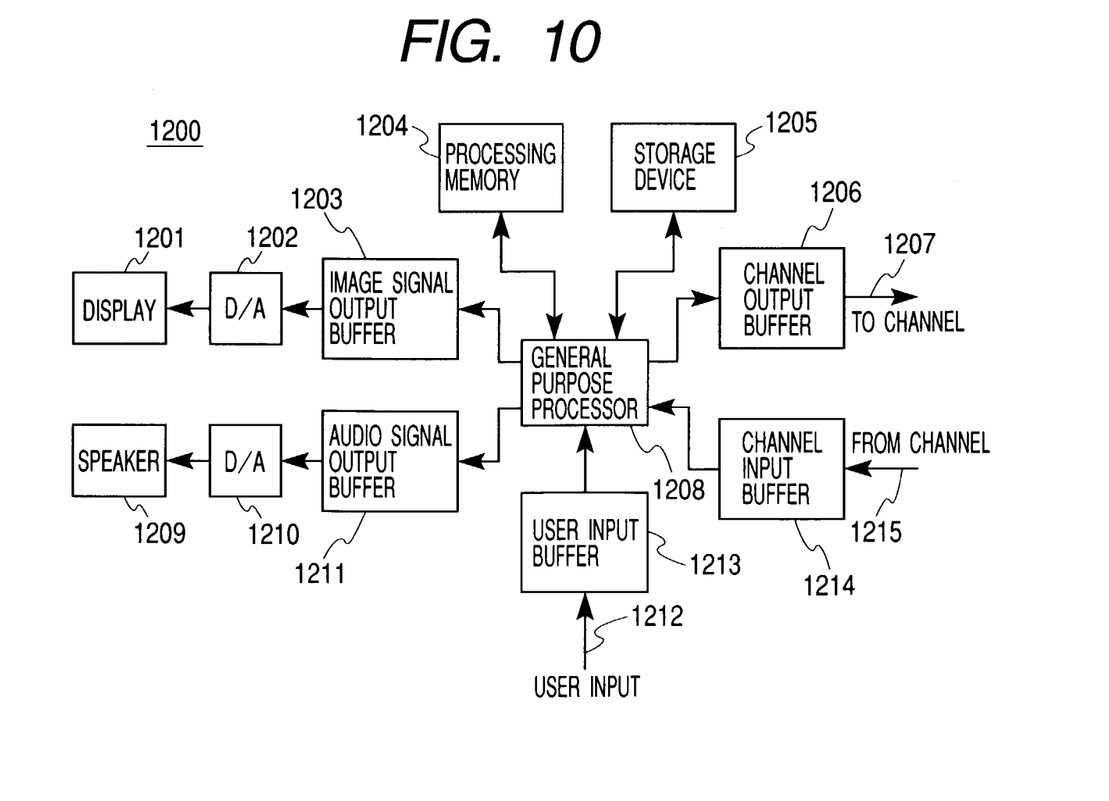
FIG. 10 shows an example of the configuration when the receiving terminals shown in FIGS. 5 and 6 are implemented using a general-purpose processor.

FIG. 10 shows an example of the configuration of a receiving terminal 1200 in case the receiving terminals shown in FIGS. 5 and 6 are implemented using a general-purpose processor. In the receiving terminal 1200, information 1215 received via a communication channel is input to a general-purpose processor 1208 after the information is once stored in a channel input buffer 1214. The general-purpose processor executes each processing of channel decoding, demultiplexing, image signal decoding and audio decoding utilizing a storage device 1205 such as a hard disk or a floppy disk and a processing memory 1204. A decoded image signal acquired as a result is output to a display 1201 as an output image signal via a digital/analog (D/A) converter 1202 after the decoded image signal is once stored in an image signal output buffer 1203. Similarly, audio information is output to a speaker 1209 as an output audio signal via a D/A converter 1210 after the audio information is once stored in an audio output buffer 1211. In the meantime, input 1212 from a user is processed in the general-purpose processor 1208 via a user input buffer 1213 and is transmitted to a communication channel as transmitted information 1207 after multiplexing and channel coding are applied. The input 1212 from the user is equivalent to the request 501 by the user in relation to error resilience in case the receiving terminal 1200 fulfills the role of the receiving terminal 500 shown in FIG. 5. In the meantime, in case the receiving terminal 1200 fulfills the role of the receiving terminal 600 shown in FIG. 6, input 1212 from a user is equivalent to the setting 601 by the user.

Figure 12:
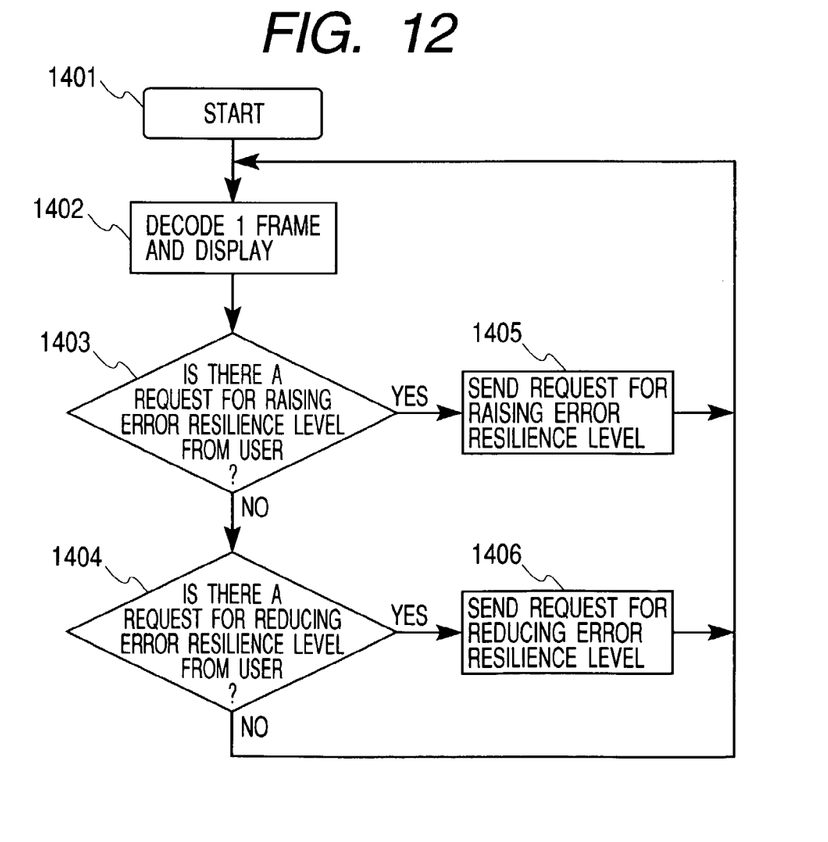
FIG. 12 is a flowchart showing an example of processing in the receiving terminals implemented using a general-purpose processor shown in FIG. 10.

FIG. 12 shows an example of a flowchart in case the receiving terminal 1200 shown in FIG. 10 fulfills the role of the receiving terminal 500 shown in FIG. 5. In step 1401, processing is started and in step 1402, an image signal for one frame is decoded and displayed. Next, in step 1403, it is checked whether a user makes a request for raising the error resilience level or not and in case the user makes the request, a signal requesting to raise an error resilience level is output to a transmitting terminal which is the other party of communication in step 1405. Similarly, in step 1404, it is checked whether the user makes a request for lowering an error resilience level or not and in case the user makes the request, a signal requesting to lower an error resilience level is output in step 1406. Then the processing is returned to step 1402, and the next frame is decoded and displayed, and similar processing is repeated.

Figure 11:
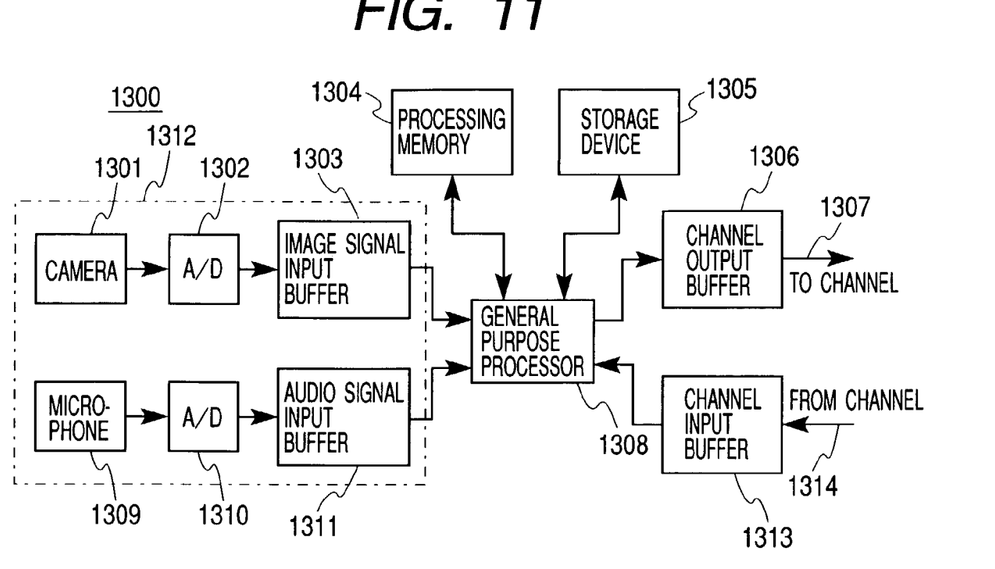
FIG. 11 shows an example of the configuration when the transmitting terminal shown in FIG. 8 is implemented using a general-purpose processor.

FIG. 11 shows an example of the configuration of a transmitting terminal 1300 in case the transmitting terminal shown in FIG. 8 is implemented using a general-purpose processor. In FIG. 11, as in the example shown in FIG. 9A, it is supposed that video information is input via a camera and is coded in real time. An input image signal input via an A/D converter 1302 from a camera 1301 is stored in an image signal input buffer 1303. A general-purpose processor 1308 reads this information from the image signal input buffer and executes video coding processing. In the meantime, audio information is also input to an audio signal input buffer 1311 via a microphone 1309 and an A/D converter 1310, and in the general-purpose processor 1308 as in the case of an image signal, and coding processing is applied. The general-purpose processor executes the processing of coding, multiplexing and channel coding utilizing a storage device 1305 and a processing memory 1304. Information output from the general-purpose processor is output as transmitted information 1307 after the information is once stored in a communication channel output buffer 1307. In the meantime, the processing of channel decoding and demultiplexing is applied to information 1314 transmitted from a receiving terminal in the general-purpose processor 1308 via a communication channel input buffer 1313. Here, a received request (806 shown in FIG. 8) for changing the error resilience level is extracted and the level of error resilience applied to a coded bit stream is changed in coding processing. In case the transmitting terminal 1300 fulfills the role of the implemented examples shown in FIGS. 9B and 9C, a video and audio input part 1312 shown by an alternate long and short dash line is not required.

Figure 13:
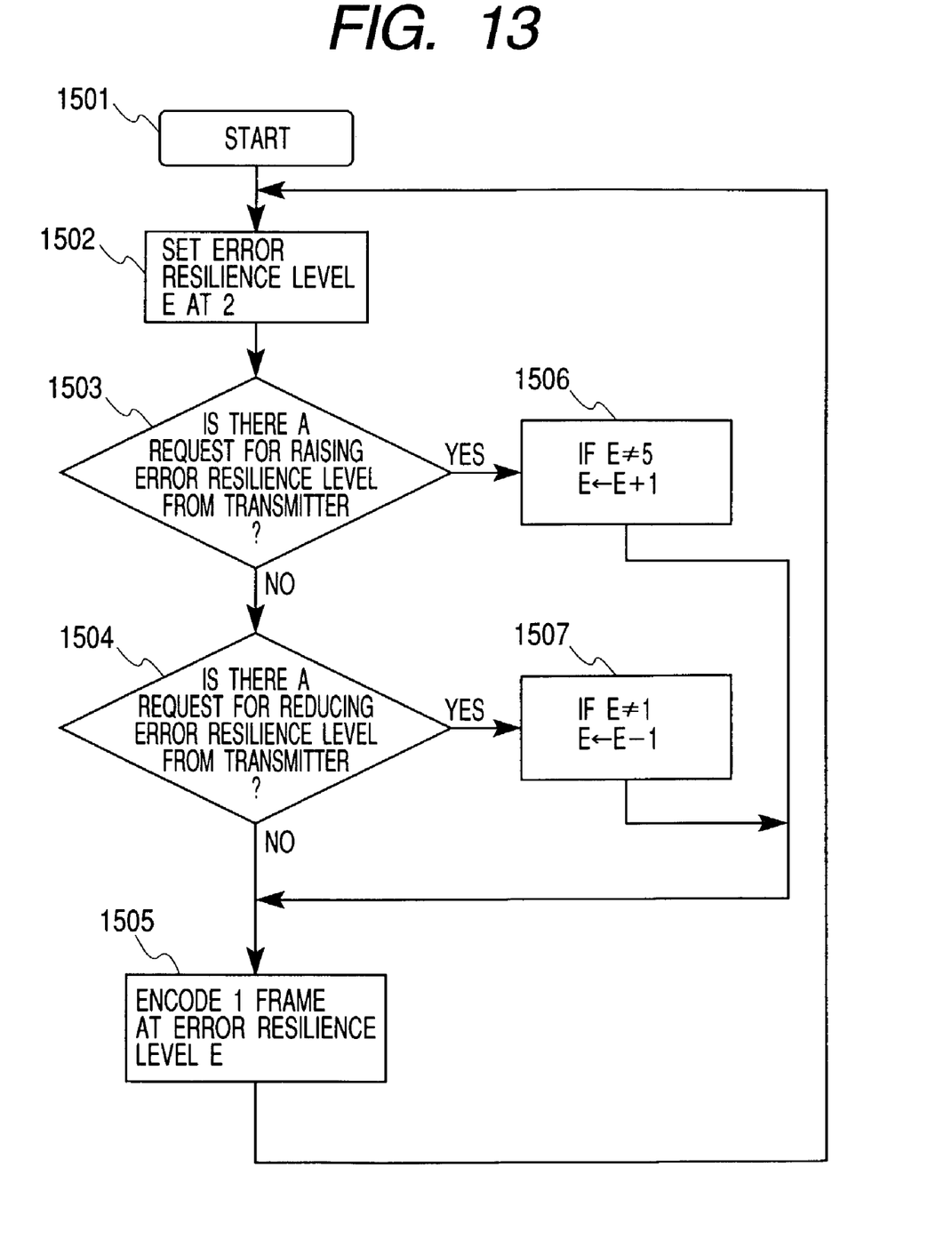
FIG. 13 is a flowchart showing an example of processing in the transmitting terminal implemented using a general-purpose processor shown in FIG. 11.

FIG. 13 shows an example of a flowchart showing the processing in the transmitting terminal 1300 shown in FIG. 11. In step 1501, processing is started and in step 1502, level E of error resilience is set to 2 which is an initial value. Next, in step 1503, it is checked whether a request for raising the error resilience level from a receiving terminal is received or not and in case the request is received, 1 is added to the value of E in step 1506. However, in case the value of E is already 5 which is the maximum value, the value of E is not changed. In case no request for raising the error resilience level is received, it is checked whether a request for lowering an error resilience level is received or not in step 1504 and 1 is subtracted from the value of E in step 1507. However, in case the value of E is 1 which is the minimum value, the value of E is not changed. In case no request for lowering the error resilience level is received in step 1504 or after the processing in step 1506 or 1507 is finished, the error resilience level is set to an "E"th level in step 1505, an image signal for one frame is coded and coded information is output to a communication channel. After the processing is finished, the process is returned to step 1503 again.

If multimedia communication utilizing a communication channel in which transmission errors often occur is done according to the invention, the level of error resilience applied to a transmitted coded bit stream can be controlled according to the situation of the transmission channel and the request of a user.

What is claimed is:

1. A multimedia receiving terminal provided with a first unit that receives a coded bit stream of information transmitted at a predetermined error resilience level, which is adjusted based on an observed transmission error rate, by a transmitting terminal through a communication channel and a second unit that decodes and displays the received bit stream, comprising:
   a third unit that evaluates the error resilience of information received by the receiving terminal and compares the error resilience with a predetermined setting related to the error resilience of the coded bit stream transmitted by the transmitting terminal; and
   a fourth unit that transmits, to the transmitting terminal through the communication channel, a request to change the error resilience level of the coded bit stream transmitted by the transmitting terminal,
   wherein if the transmission error rate is higher than the predetermined setting, the fourth unit transmits a request to raise the error resilience level of the coded bit stream transmitted by the transmitting terminal, and
   wherein if the transmission error rate is lower than the predetermined setting, the fourth unit transmits a request to lower the error resilience level of the coded bit stream transmitted by the transmitting terminal to improve the quality of a coded image.

2. A multimedia receiving terminal according to claim 1, wherein the request to change the error resilience level of the coded bit stream transmitted by the transmitting terminal, includes a request in a state in which the transmitting terminal transmits video information and audio information and a request in a state in which the transmitting terminal transmits only audio information.

3. A multimedia receiving terminal according to claim 1, wherein when the request to change the error resilience level of the coded bit stream transmitted by the transmitting terminal, is transmitted to the transmitting terminal, a message related to the contents of the request is displayed on a screen of the receiving terminal.

4. A multimedia receiving terminal according to claim 1, wherein choices are provided when making the request to change the error resilience level of the coded bit stream transmitted by the transmitting terminal, and
   wherein the choices include a choice for requesting to transmit a bit stream including video information and audio information and a choice for requesting to transmit a bit stream including only audio information or only video information.

5. A multimedia receiving terminal according to claim 1, wherein choices are provided when making the request of the user to change the error resilience level of the coded bit stream transmitted by the transmitting terminal, and
   wherein the choices include a state in which the disturbance of an image is relatively much and the frame rate of a dynamic image is relatively high and a state in which the disturbance of an image is relatively small and the frame rate of a dynamic image is relatively low.

6. A multimedia transmitting terminal corresponding to a multimedia receiving terminal provided with a first unit that receives a coded bit stream of information transmitted at a predetermined error resilience level, which is adjusted based on an observed transmissin error rate, by the transmitting terminal through a communication channel, and a second unit that decodes and displays the received bit stream, the multimedia transmitting terminal comprising:
   a server that stores plural coded bit streams, each having a different error resilience of the same contents,
   wherein a coded bit stream having a predetermined error resilience is selected and transmitted according to a request to change the error resilience level of the coded bit stream transmitted by the transmitting terminal;
   a third unit that receives, from the receiving terminal, the request to change the error resilience level of the coded bit stream transmitted by the transmitting terminal,
   wherein the receiving terminal further includes a fourth unit that evaluates the error resilience of information received by the receiving terminal and compares the error resilience with a predetermined setting related to the error resilience of the coded bit stream transmitted by the transmitting terminal, and a fifth unit that transmits, to the transmitting terminal through the communication channel, the request to change the error resilience level of the coded bit stream transmitted by the transmitting terminal,
   wherein if the transmission error rate is higher than the predetermined setting, the fifth unit transmits the request to raise the error resilience level of the coded bit stream transmitted by the transmitting terminal, and
   wherein if the transmission error rate is lower than the predetermined setting, the fifth unit transmits the request to lower the error resilience level of the coded bit stream transmitted by the transmitting terminal to improve the quality of a coded image.

* * * * *